United States Patent [19]

Horrocks

[11] 3,775,847
[45] Dec. 4, 1973

[54] CUTTING BLADE FOR REMOVING COVERING MATERIAL FROM AN ELECTRICALLY CONDUCTIVE CABLE

[75] Inventor: Raymond G. Horrocks, Parkview, Ohio

[73] Assignee: The Scott & Fetzer Company, Cleveland, Ohio

[22] Filed: Aug. 11, 1971

[21] Appl. No.: 170,845

Related U.S. Application Data

[60] Division of Ser. No. 878,022, Jan. 2, 1971, Pat. No. 3,620,104, which is a continuation-in-part of Ser. No. 846,196, July 30, 1969, abandoned.

[52] U.S. Cl. .................................................. 30/353
[51] Int. Cl. ............................................. H03g 1/12
[58] Field of Search ....................... 81/9.5 R, 9.5 C; 30/90.1, 353, 287; 145/3.1; 82/20; 29/103, 97, 11

[56] References Cited
UNITED STATES PATENTS
2,602,995  7/1952  Hurt...................................... 30/287
2,462,707  2/1949  Allen ................................... 29/97 X
3,377,891  4/1968  Horrocks ........................... 81/9.5 C
3,398,610  8/1968  Matthews........................... 81/9.5 C Primary Examiner—Harold D. Whitehead
Assistant Examiner—Roscoe V. Parker
Attorney—Blythe D. Watts et al.

[57] ABSTRACT

A cutting blade for removing insulation and/or semi-conductive material from an electrically conductive cable. The blade includes a flat, thin body with a plane bottom surface and a thin flange at one end of the body having a plane outer side surface with the blade being beveled to form a long cutting edge on the body and a short cutting edge on the flange, the cutting edges making a wide included angle with one another and having a common end.

5 Claims, 7 Drawing Figures

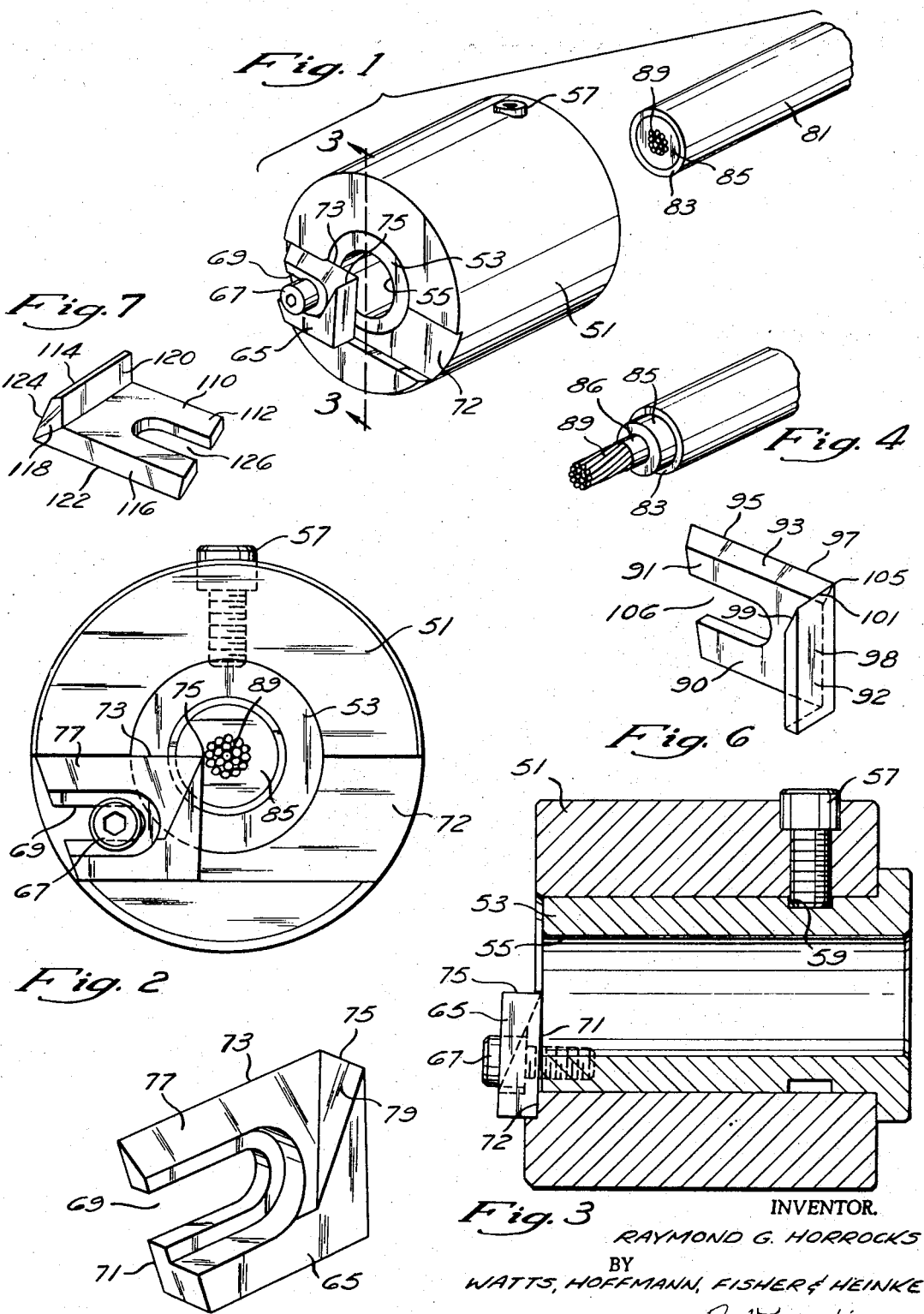

3,775,847

CUTTING BLADE FOR REMOVING COVERING MATERIAL FROM AN ELECTRICALLY CONDUCTIVE CABLE

This application is a division of my copending application, Ser. No. 878,022 which was allowed on June 2, 1971, now U.S. Pat. No. 3,620,104 and which is a continuation-in-part of my application Ser. No. 846,196, filed July 30, 1969, and now abandoned.

BACKGROUND OF THE INVENTION

The prior art which is most nearly pertinent to this invention and which is known to me are my U.S. Pat. Nos. 3,377,891 and 3,548,690 and Matthews U.S. Pat. No. 3,398,610.

The cutting blade of the just identified patents consists of a thick body of metal, some of which metal has been cut away to form cutting edges along one side and one end of the body.

Such blades are unnecessarily expensive in that the bodies contain more metal than is needed in the blade, considerable amounts of metal must be removed from the body and the removed metal is costly in time and material.

The present invention provides a cutting blade which is much less expensive not only in the costs of metal used and metal removed but in the costs of such removal.

SUMMARY OF THE INVENTION

A blade embodying the present invention includes a thin elongated body having a thin flange at one edge thereof, inclined surfaces on one end of the body and an adjacent edge of the flange and an aperture through the body to receive means for fixedly securing the blade to a holding tool. The cutting edges of the blade are unequal in length, have a common end and form a wide included angle, for example, between about 70° and about 90° to one another.

By suitably positioning the first cutting edge of the blade relative to the cable, one or more layers of the material covering the conductor may be removed. In this manner the outer semi-conducting material, that material and the insulation therewithin, and that material, the insulation and the inner semi-conducting material may be removed when the blade is positioned with the first cutting edge substantially tangent to the outer circumference of the insulation or of the inner semi-conducting material or of the conductor, respectively.

BRIEF DESCRIPTION OF THE DRAWINGS

In the drawings accompanying and forming a part of this specification:

FIG. 1 is a perspective view of a tool and blade assembled therewith for removing covering material from a cable;

FIG. 2 is an end view of the tool and blade of FIG. 1;

FIG. 3 is a longitudinal sectional view of the tool of FIG. 1 taken on line 3—3 of FIG. 1 and showing the cutting blade in elevation;

FIG. 4 is a perspective view of the cable of FIG. 1 from which insulation and the outer and inner layers of semi-conductive material have been removed by the tool and blade of FIG. 1;

FIG. 5 is a perspective view of the cutting blade of FIGS. 1-3;

FIG. 6 is a perspective view of a form of a cutting blade embodying the present invention; and FIG. 7 is a view similar to FIG. 6 but showing a modified form of cutting blade.

The combination of the tool and cutting blades disclosed in FIGS. 1, 2, 3 and 5 of this application have been claimed in my pending application Ser. No. 878,022 and are not being claimed in this application. Those figures are presented in this application to make it clear that the cutting blades which embody the present invention and are being claimed herein may be assembled with the tool of FIGS. 1, 2 and 3 as substitutes for the cutting blade of FIG. 5.

The tool of FIG. 1 includes an elongated cylindrical body 51 fitted with a bushing 53 which has a passage or bore 55 only slightly greater than the outside diameter of the cable from which covering material is to be removed so that the cable has a close sliding fit in the bushing. The bushing is held securely in fixed position in the body by any suitable means, for example, a screw 57 which has threaded engagement in the body and projects into an annular recess in the bushing. At one end of body 51 is positioned blade 65 which is held in place on the body by screw 67 which extends through a slot 69 in the blade.

The blade 65 is provided with a plane lower surface 71 which seats in a recess 72 in the end of body 51 and is inclined at a small angle, for example, between about 2° and about 5° to the longitudinal centerline of the bore in bushing 53. The blade has a long cutting edge 73 and a short cutting edge 75 which edges make a wide, included, preferably substantially right angle with one another and have a common end. The surface of the blade slopes upwardly from the lower surface 71 as at 77, and slopes transversely from the adjacent side surface of the blade, as at 79. The surfaces 77 and 79 make angles of between about 25° and about 35° with the bottom and side surfaces of the blade.

It will be understood that the tool of FIGS. 1, 2 and 3 may be used with cables which differ in diameter but since it is important that in each instance the cable should have a close sliding fit in the tool and that the cutting edges of the cutting tool should be positioned with exactness, the range of sizes of cables from which covering material may be removed with any given tool is quite limited. For example, one tool may take cables ranging from ¾" to about 1 ½" and another tool may take cables ranging from about 1" to about 1 ¾". Of course, these ranges may be varied as desired.

FIG. 6 shows a form of cutting blade 90 which is being claimed herein and which resembles in certain respects the blade of FIG. 5.

Cutting blade 90 consists of a flat, thin body 91 defined by parallel top and bottom surfaces and a flat thin flange 92 defined by inner and outer surfaces at one end of the body 91. One edge of body 91 is beveled as at 93 and forms a cutting edge 95 at the intersection of that surface with the flat undersurface 97 of body 91. Flange 92 has an outer surface 98 and a beveled surface 99 corresponding to the beveled surface 93 and forming a cutting edge 101 at the intersection of the beveled surface 99 with surfaces 98. At the other end of body 91 a notch or aperture 106 is formed for a securing bolt. It will be noted that the long and short cutting edges 95 and 101 make a wide included preferably substantially right angle with one another and have a common end point indicated at 105. The beveled surfaces 93 and 99 of the blade make small angles, for example, from about 25° to about 35°, with the bottom surface 97 and the outer surface 98, respectively.

The cutting blade which is shown in FIG. 7 and claimed herein resembles the blades of FIG. 6 but differs therefrom in certain respects.

The blade 110 of FIG. 7 includes a flat thin body 112 and a thin flange 114 at one end thereof defined by parallel top and bottom surfaces and a flange 114 at one end thereof defined by inner and outer surfaces. The body is beveled along one edge as at 116, making an angle of between about 25° and about 35° with the bottom surface of body 110. The end of flange 114 is similarly beveled as at 118. The inner surface 120 of flange 114 makes an included angle of about 90° with the top surface of body 110. The outer surface of flange 114 is inclined at an angle to surface 120. The edge 122 on body 110 and edge 124 on flange 114 have a common end and make a wide included angle, for example, from about 70° to about 85°. Notch of aperture 126 serves to receive a securing bolt such as bolt 67 of FIG. 3.

It will be understood that cutting blades 90 or 110 may be used in lieu of blade 65 as desired.

It will be understood that the shorter cutting edges of blades 90 and 110 should be at least as long as the longitudinal thicknes of the chip or ribbon of covering material being removed from the cable; and that the longer cutting edges of those blades should be at least as long as the radial or transverse thicknes of the material being removed. Accordingly, the longer cutting edge will be at least twice and usually several times as long as the shorter cutting edge.

It will be seen from a comparison of the blades of FIGS. 6 and 7 with the blade of FIG. 5 that those two blades initially contained much less material than did the blade of FIG. 5 and also that the amount of metal removed to form the beveled surfaces on the blades of FIGS. 6 and 7 are much less than the amount of metal removed from the blade of FIG. 5. It will be understood that the cost of removing metal to form the beveled edges of FIGS. 6 and 7 will be considerably less than the cost of forming the beveled edges on the tool of FIG. 5.

It will be seen from the drawings that each of the three blades 65, 90 and 110 has plane top and bottom surfaces on the body portion, outer end surfaces and, in FIGS. 6 and 7, the flanges are thinner than the thin bodies and the top surfaces of the flanges are plane surfaces. In each of the blades the long cutting edge is at least twice as long as the short cutting edge, is longer than the radial thickness of the material to be removed and the length of the blade is not longer than the radius of the holder for the blade.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiments of the invention may be made without departing from the scope of the invention as set forth in what is claimed.

What is claimed is:

1. A cutting blade for removing covering material from an electrically conductive cable comprising a blade having a flat thin body with plane top and bottom surfaces and a thin flange at one end of said body having plane inner and outer side surfaces, the inner side surface of the flange making an included angle with said top surface of about 90°, said blade being beveled along one edge at angles of from about 25° to about 35° with said bottom and outer side surfaces and forming a long cutting edge on the body at least as long as the radial thickness of the covering material to be removed and a short cutting edge on the flange at least as long as the longitudinal width of the covering material to be removed, said long edge being at least twice as long as the short edge, said cutting edges making an included angle of between about 70° and about 90° with one another and having a common end, said blade being not longer than the radius of a holder for the blade.

2. The cutting blade set forth in claim 1 in which the blade is provided with an aperture for the reception of means for fixedly securing the blade to a tool.

3. The cutting blade set forth in claim 1 in which the cutting edges make an included angle of between about 70° and about 90° with each other.

4. The cutting blade set forth in claim 1 in which the cutting edges make an included angle of about 90° with each other.

5. The cutting blade set forth in claim 1 in which the outer side surface of the flange and the cutting edge on the flange make included angles of between about 70° and about 85° with the bottom surface of the said body and the cutting edge on the body, respectively.

* * * * *